US007924885B2

United States Patent
De-Leon et al.

(10) Patent No.: US 7,924,885 B2
(45) Date of Patent: Apr. 12, 2011

(54) METHODS AND APPARATUSES FOR CIRCUIT EMULATION MULTI-CHANNEL CLOCK RECOVERY

(75) Inventors: Moshe De-Leon, Kiriat Ono (IL); Ofer Kimelman, Tel Aviv (IL)

(73) Assignee: Siverge Networks Ltd, Herzliya (IL)

( * ) Notice: Subject to any disclaimer, the term of this patent is extended or adjusted under 35 U.S.C. 154(b) by 202 days.

(21) Appl. No.: 11/985,859

(22) Filed: Nov. 17, 2007

(65) Prior Publication Data

US 2008/0186999 A1    Aug. 7, 2008

Related U.S. Application Data

(60) Provisional application No. 60/866,502, filed on Nov. 20, 2006.

(51) Int. Cl.
*H04J 3/06* (2006.01)
(52) U.S. Cl. ..................... 370/503; 370/506; 370/518
(58) Field of Classification Search .................. 370/503, 370/395.62, 235, 506, 518
See application file for complete search history.

(56) References Cited

U.S. PATENT DOCUMENTS

| 6,061,352 | A | * | 5/2000 | Yamazaki et al. | 370/394 |
|---|---|---|---|---|---|
| 6,078,594 | A | * | 6/2000 | Anderson et al. | 370/498 |
| 6,107,848 | A | * | 8/2000 | Pickering et al. | 327/146 |
| 6,167,048 | A | * | 12/2000 | Law et al. | 370/395.62 |
| 6,195,353 | B1 | * | 2/2001 | Westberg | 370/230.1 |
| 6,252,850 | B1 | * | 6/2001 | Lauret | 370/235 |
| 6,400,683 | B1 | * | 6/2002 | Jay et al. | 370/229 |
| 6,456,128 | B1 | * | 9/2002 | Nakamura | 327/149 |
| 6,463,109 | B1 | * | 10/2002 | McCormack et al. | 375/355 |
| 6,466,098 | B2 | * | 10/2002 | Pickering | 331/25 |
| 6,714,548 | B2 | * | 3/2004 | Lauret | 370/395.62 |
| 6,721,328 | B1 | * | 4/2004 | Nichols et al. | 370/395.62 |
| 6,985,968 | B1 | * | 1/2006 | Gammenthaler, Jr. | 709/250 |
| 7,127,022 | B1 | * | 10/2006 | Dieguez | 375/375 |
| 7,646,836 | B1 | * | 1/2010 | Mays | 375/354 |
| 2001/0044277 | A1 | * | 11/2001 | Kremsl et al. | 455/66 |
| 2005/0100054 | A1 | * | 5/2005 | Scott et al. | 370/503 |
| 2007/0019686 | A1 | * | 1/2007 | Belk et al. | 370/516 |

FOREIGN PATENT DOCUMENTS

| EP | 901126 A1 | * | 3/1999 |
|---|---|---|---|
| EP | 0901126 A1 | * | 3/1999 |
| EP | 1432161 A2 | * | 6/2004 |

* cited by examiner

*Primary Examiner* — Ricky Ngo
*Assistant Examiner* — Dewanda Samuel

(57) ABSTRACT

A method and system for providing multi-channel circuit emulation clock recovery wherein a single instance of the clock recovery logic effects circuit emulation clock recovery for multiple channels. For one embodiment of the invention, fine tuning clocking is effected by comparing an outgoing clock with a recovered clock and switching a clock recovery mechanism, the switching performed in conjunction with a multi-channel context.

3 Claims, 3 Drawing Sheets

METHODS AND APPARATUSES FOR CIRCUIT EMULATION MULTI-CHANNEL CLOCK RECOVERY

CLAIM OF PRIORITY

This application is a non-provisional application that claims priority to U.S. Provisional Patent Application No. 60/866,502 entitled "Methods and Apparatuses for Circuit Emulation Multi-Channel Clock Recovery" filed on Nov. 20, 2006.

FIELD

Embodiments of the invention relate generally to the field of telecommunication infrastructure, and more specifically to the field of circuit emulation clock recovery.

BACKGROUND

Circuit emulation is a known technology where a data stream of a constant fixed rate is broken into data packets on a transmitting end of the network, then transmitted over the network with unpredicted timing in a bursting fashion. On the receiving end the arriving data packets are typically buffered into a sufficiently large memory. The desired outgoing bit stream constant-rate is then recovered and continually adapted to the overall incoming data rate actually representing the averaged received data rate over a wide period of time. This function is commonly referred to as circuit emulation clock recovery.

Methods and circuitry for implementing such clock recovery functionality are well known and commonly applied. Such conventional schemes, however, require instantiating a clock-recovery module for every channel. Conventional schemes for applying clock recovery for handling massive multiple channels is costly and inefficient.

SUMMARY

For one embodiment of the invention, a method is disclosed wherein a single instance of a clock-recovery module can serve massive multiple channels.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and system for providing multi-channel circuit emulation clock recovery wherein a single instance of the clock recovery logic effects circuit emulation clock recovery for multiple channels. For one embodiment of the invention, fine tuning clocking is effected by comparing an outgoing clock with a recovered clock and switching a clock recovery mechanism, the switching performed in conjunction with a multi-channel context.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 1:
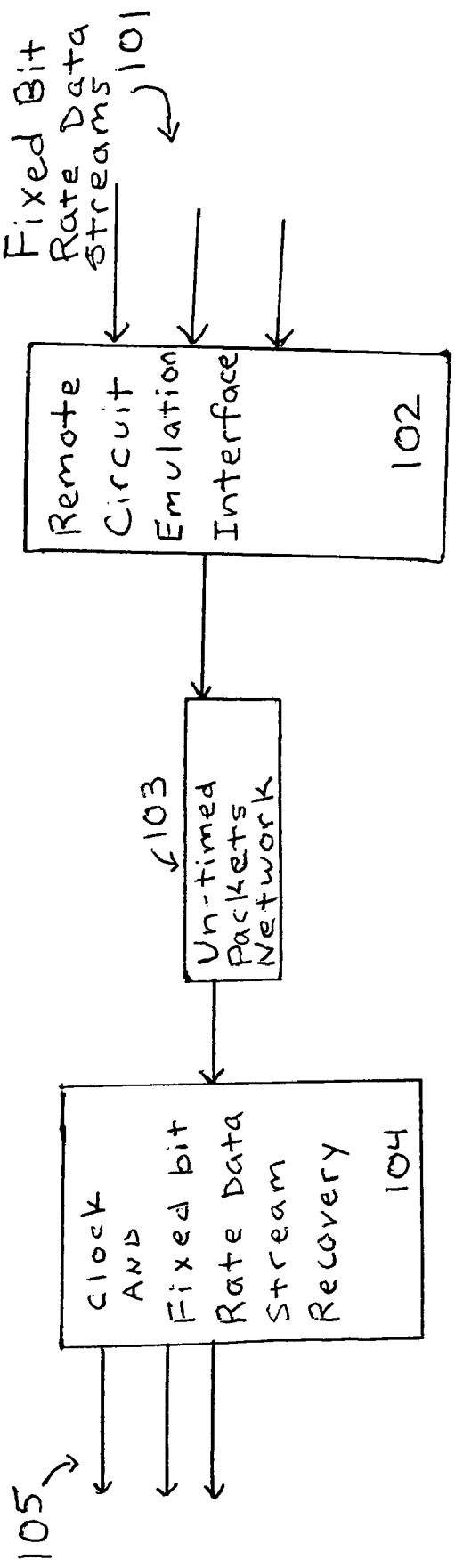
FIG. 1 illustrates a multi-channel circuit emulation configuration in accordance with one embodiment of the invention.

Embodiments of the invention are applicable in a variety of settings in which a multi-channel system requires circuit emulation clock recovery FIG. 1 illustrates a multi-channel circuit emulation configuration in accordance with one embodiment of the invention. As shown in FIG. 1, multiple fixed bit rate data streams are input to a circuit emulation interface. The output of the circuit emulation interface is transmitted via a network to the clock and fixed bit rate data stream recovery module which outputs recovered fixed bit rate independent data streams.

Figure 2:
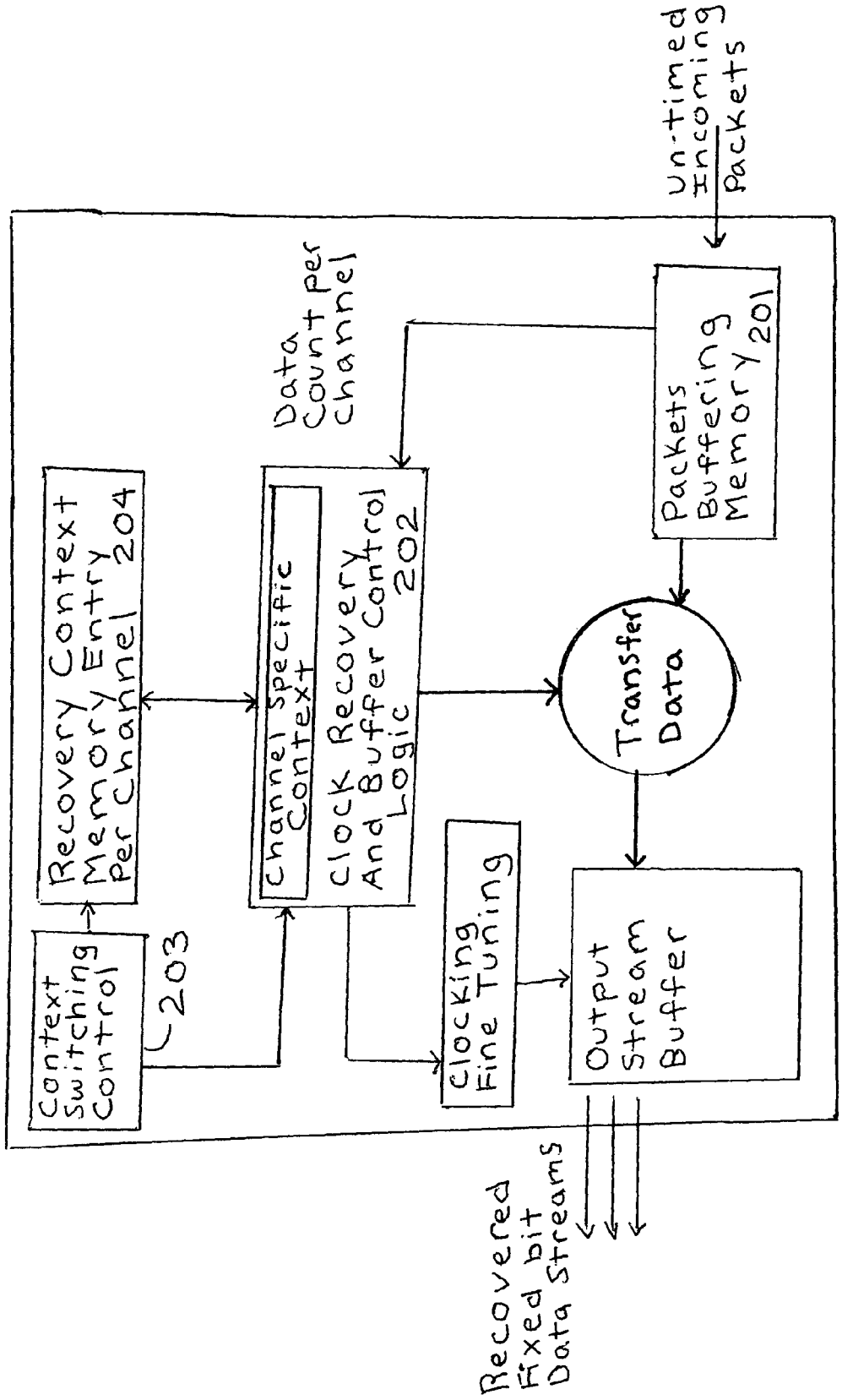
FIG. 2 illustrates a process to effect clock and constant bit rate recovery in accordance with one embodiment of the invention.

FIG. 2 illustrates a process to effect clock and constant bit rate recovery in accordance with one embodiment of the invention. As illustrated in FIG. 2, on the receiving side, the packets associated with multiple communication channels are stored into a packet buffering memory 201; clock recovery logic 202 analyzes the untimed incoming data packets un-constant rate, recovers the original data rate and re-constructs the fixed-rate data stream.

The invented Multi-Channel clock recovery solution enables the same clock recovery logic 202 to be utilized for multiple channels by applying a context-switch mechanism. The context-switching control 203 loops over all channels allocating the recovery-logic at each context slot for a short period to a specific channel in which the most recent context of that channel clock-recovery logic is retrieved from the context memory 204 and at the end of the processing period the updated context is stored into the context memory 204.

Fine tuning and bit rate adjustment of the channel clocking, is guided by the rough clock recovery mechanism, comparing between the recovered rough clock and the actual generated clock, this as well is managed by the described context switching mechanism 203.

In accordance with one embodiment of the invention, the context of the channel clock-recovery logic 202 is processed by a digital processing system (DPS). The DPS may be configured to store, process, and communicate a plurality of various types of digital information.

Figure 3:
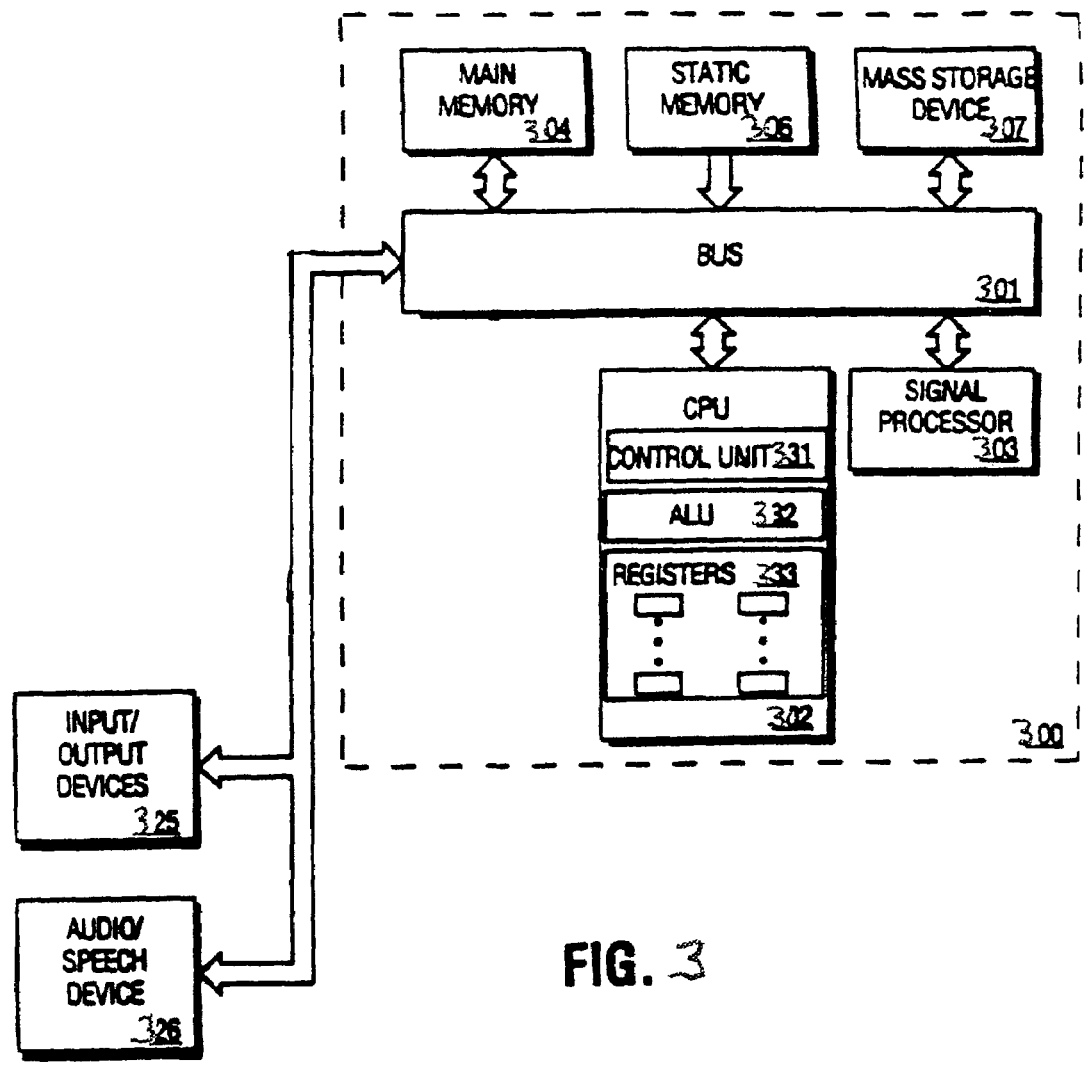
FIG. 3 illustrates a functional block diagram of a digital processing system in accordance with one embodiment of the invention.

As discussed above, embodiments of the invention may employ a DPS or devices having digital processing capabilities. FIG. 3 illustrates a functional block diagram of a digital processing system in accordance with one embodiment of the invention. The components of processing system 300, shown in FIG. 3 are exemplary in which one or more components may be omitted or added. For example, one or more memory devices may be utilized for processing system 300.

Referring to FIG. 3, processing system 300 includes a central processing unit 302 and a signal processor 303 coupled to a main memory 304, static memory 306, and mass storage device 307 via bus 301. In accordance with an embodiment of the invention, main memory 304 may store a selective communication application, while mass storage devise 307 may store various digital content as discussed above. Processing system 300 may also be coupled to input/output (I/O) devices 325, and audio/speech device 326 via bus 301. Bus 301 is a standard system bus for communicating information and signals. CPU 302 and signal processor 303 are processing units for processing system 300. CPU 302 or signal processor 303 or both may be used to process information and/or signals for processing system 300. CPU 302 includes a control unit 331, an arithmetic logic unit (ALU) 332, and several registers 333, which are used to process information and signals. Signal processor 303 may also include similar components as CPU 302.

Main memory 304 may be, e.g., a random access memory (RAM) or some other dynamic storage device, for storing information or instructions (program code), which are used by CPU 302 or signal processor 303. Main memory 304 may store temporary variables or other intermediate information during execution of instructions by CPU 302 or signal processor 303. Static memory 306, may be, e.g., a read only memory (ROM) and/or other static storage devices, for storing information or instructions, which may also be used by CPU 302 or signal processor 303. Mass storage device 307 may be, e.g., a hard or floppy disk drive or optical disk drive, for storing information or instructions for processing system 300.

General Matters

Embodiments of the invention provide a multi-channel circuit emulation clock recovery scheme wherein a single instance of the clock recovery logic effects circuit emulation clock recovery for multiple channels. For one embodiment of the invention, fine tuning clocking is effected by comparing an outgoing clock with a recovered clock and switching a clock recovery mechanism, the switching performed in conjunction with a multi-channel context.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central cite or, alternatively, one or more operations may be performed elsewhere.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for multi-channel circuit emulation clock recovery, wherein a single instance of a clock recovery logic effects circuit emulation clock recovery for a plurality of communications channels, the method comprising:
   receiving untimed packets, each packet associated with one of the plurality communications channels of a multi-channel telecommunication system;
   storing the packets in a packet buffering memory;
   analyzing packets associated with a first channel using the clock recovery logic of a single circuit emulation clock recovery mechanism;
   comparing an outgoing clock with a recovered clock for the analyzed packets to effect fine-tuning of the recovered clock;
   switching the single circuit emulation clock recovery mechanism to a second channel of the plurality of communications channels, the switching performed in conjunction with a multi-channel context; and
   providing recovered fixed-bit independent data streams for each of the plurality of communications channels.

2. A system providing multi-channel circuit emulation clock recovery wherein a single instance of a clock recovery mechanism effects circuit emulation clock recovery for multiple telecommunication channels of a telecommunication system, the system comprising:
   a packet buffering memory for storing untimed packets, each packet associated with one of a plurality communications channels of a multi-channel telecommunication system;
   the single instance of the circuit emulation clock recovery mechanism for analyzing packets, wherein analyzing includes comparing an outgoing clock with a recovered clock for each packet to effect fine-tuning of the recovered clock; and
   a context switching control for switching the single instance of the clock recovery mechanism between the plurality of communications channels to update a context of each channel of the plurality of communications channels, the switching performed in conjunction with a multi-channel context, wherein the clock recovery mechanism is allocated by looping the context-switching control over all of the plurality of communication channels, the clock recovery mechanism allocated, for a specified processing time, to a specified communication channel in which a most recently updated context of the specified communication channel clock recovery mechanism is retrieved from a context memory, the context memory storing an updated context upon completion of the specified processing time.

3. An apparatus for providing multi-channel circuit emulation clock recovery, wherein a single instance of a clock recovery logic effects circuit emulation clock recovery for a plurality of communications channels, including one or more processors and one or more storage devices coupled to a corresponding processor having instructions stored thereon which when executed by the processor cause the processor to perform a method comprising:
- receiving untimed packets, each packet associated with one of the plurality communications channels of a multi-channel telecommunication system;
- storing the packets in a packet buffering memory;
- analyzing packets associated with a first channel using the clock recovery logic of a same circuit emulation clock recovery mechanism;
- comparing an outgoing clock with a recovered clock for the analyzed packets to effect fine-tuning of the recovered clock;
- switching the same circuit emulation clock recovery mechanism to a second channel of the plurality of communications channels, the switching performed in conjunction with a multi-channel context; and
- providing recovered fixed-bit independent data streams for each of the plurality of communications channels.

\* \* \* \* \*